United States Patent
Kulkarni

(10) Patent No.: US 8,812,725 B2
(45) Date of Patent: Aug. 19, 2014

(54) SYSTEM AND METHOD FOR LATENCY REDUCTION IN A NETWORK ENVIRONMENT

(75) Inventor: Ajay A. Kulkarni, San Jose, CA (US)

(73) Assignee: Cisco Technology Inc., San Jose, CA (US)

( * ) Notice: Subject to any disclaimer, the term of this patent is extended or adjusted under 35 U.S.C. 154(b) by 105 days.

(21) Appl. No.: 13/475,522

(22) Filed: May 18, 2012

(65) Prior Publication Data
US 2013/0311643 A1    Nov. 21, 2013

(51) Int. Cl.
*G06F 15/173* (2006.01)
(52) U.S. Cl.
USPC ........... 709/235; 709/226; 709/238; 709/231; 709/225
(58) Field of Classification Search
USPC ................. 709/224, 229, 230, 223, 232, 235
See application file for complete search history.

(56) References Cited

U.S. PATENT DOCUMENTS

| | | | |
|---|---|---|---|
| 7,418,494 B2 * | 8/2008 | Dahlin et al. | 709/224 |
| 8,028,130 B1 * | 9/2011 | Weiss et al. | 711/140 |
| 8,099,492 B2 * | 1/2012 | Dahlin et al. | 709/224 |
| 2004/0064577 A1 * | 4/2004 | Dahlin et al. | 709/235 |
| 2008/0313328 A1 * | 12/2008 | Dahlin et al. | 709/224 |
| 2013/0046849 A1 * | 2/2013 | Wolf et al. | 709/217 |

OTHER PUBLICATIONS

Mohammad Alizadeh, et al., "Data Center TCP (DCTP)," SIGCOMM 2010, 12 pages; http://www.stanford.edu/~alizade/Site/DCTCP_files/dctcp-final.pdf.
Jitendra Padhye, et al., "Modeling TCP Throughput: A Simple Model and its Empirical Validation," SIGCOMM 1998, 12 pages; ftp://gaia.cs.umass.edu/pub/Padhye-Firoiu98-TCP-throughput.ps.
Y. Chen, et al. "Understanding TCP Incast Throughput Collapse in Datacenter Networks," WREN 2009, 10 pages; http://www.eecs.berkeley.edu/~ychen2/professional/TCPIncastWREN2009.pdf.

* cited by examiner

*Primary Examiner* — Jude Jean Gilles
(74) *Attorney, Agent, or Firm* — Patent Capital Group

(57) ABSTRACT

A method is provided in one example embodiment that includes identifying a foreground flow that has a higher priority than at least one background traffic flow in a network. The method also includes determining (e.g., periodically) a latency metric associated with the foreground flow, and activating a latency reduction response if the latency metric exceeds a threshold. In more particular embodiments, the latency reduction response may include diverting background flows in the network to a buffer for a delay period and/or delaying acknowledgements for background flows until the latency metric is below the threshold. In yet more particular embodiments, the latency metric may be a round-trip time.

17 Claims, 3 Drawing Sheets

US 8,812,725 B2

SYSTEM AND METHOD FOR LATENCY REDUCTION IN A NETWORK ENVIRONMENT

TECHNICAL FIELD

This specification relates in general to the field of communications, and more particularly, to a system and a method for latency reduction in a network environment.

BACKGROUND

Communication between various types of networked devices relies heavily on standardized communication protocols, including transmission control protocol (TCP). TCP allows devices of all types and manufacturers to properly interpret, direct, and process data streams between devices using common connections. TCP implementations have been widely adopted for use with the Internet and the World Wide Web. While adoption and adaptation has been generally successful, the volume and complexity of data streams that include a wide range of data types from basic digital information to streaming video and audio media has created a challenge for service providers to give a smooth and satisfactory user experience. Data bottlenecks result in delays that can particularly impact the user experience. Bottlenecks can also result in dropped packets that then have to be retransmitted and exacerbate the communication bottleneck problem. Bottlenecks can often be found in data centers, which can be critical hubs for network communications. Reducing communication latency in data centers continues to present significant challenges to developers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes identifying a foreground flow that has a higher priority than at least one background traffic flow in a network. The method also includes determining (e.g., periodically) a latency metric associated with the foreground flow, and activating a latency reduction response if the latency metric exceeds a threshold. The term 'determining' in this context includes evaluating, identifying, analyzing, or otherwise processing the latency metric (which can be reflective of any suitably network characteristic, packet statistic, network delay parameter, etc.). In more particular embodiments, the latency reduction response may include diverting background flows in the network to a buffer for a delay period and/or delaying acknowledgements for background flows until the latency metric is below the threshold. In yet more particular embodiments, the latency metric may be a round-trip time.

Example Embodiments

Figure 1:
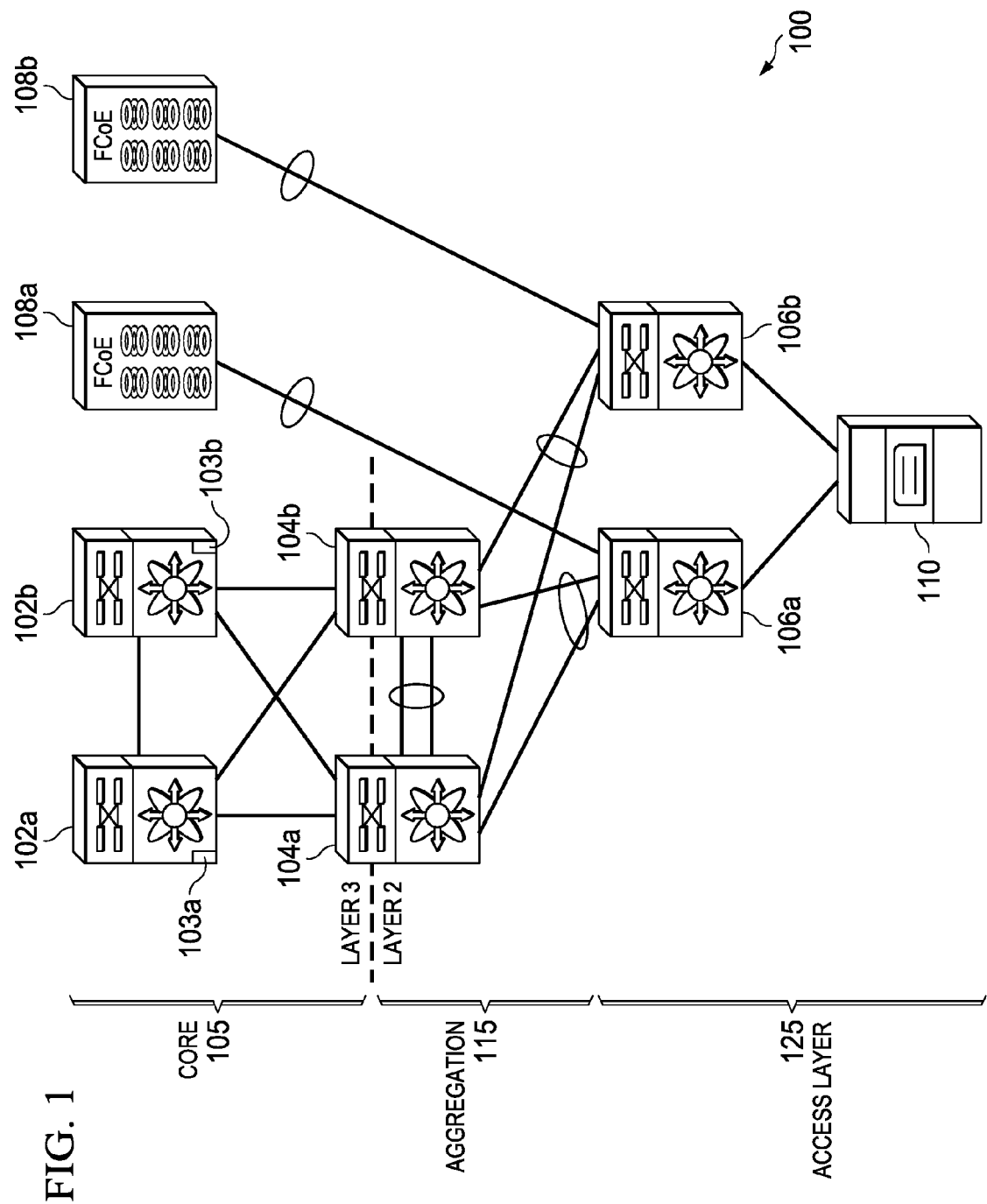
FIG. 1 is a simplified block diagram illustrating an example embodiment of a network environment in which time buffers may be used to reduce latency in accordance with this disclosure.

Turning to FIG. 1, FIG. 1 is a simplified block diagram of an example embodiment of a network environment 100 in which time buffers may be used to reduce transmission latency. Network environment 100 includes a core layer 105, an aggregation layer 115, an access layer 125, and a set of storage area networks (SANs) 108a-108b. Core layer 105 generally represents the backbone of the network and may include high-end switches (e.g., switches 102a-102b) and high-speed cables such as fiber cables. Core layer 105 is generally responsible for fast and reliable transportation of data across a network. Each switch 102a-102b may also include an application control engine 103a-103b, which may provide flow monitoring and control, loadbalancing, and other services. Aggregation layer 115 typically includes routers and layer 3 switches (e.g., switches 104a-104b) to ensure that packets are properly routed. Access layer 125 may include hubs and switches (e.g., switches 106a-106b) and can connect clients and servers (e.g., server 110) to the network. Access layer 125 may also connect SANs 108a-108b to the network.

Each of the elements of FIG. 1 may couple to one another through simple interfaces or through any other suitable connection, which provides a viable pathway for network communications. Additionally, any one or more of these elements may be combined or removed from the architecture based on particular configuration needs. Network environment 100 may include a configuration capable of Ethernet communications, and may also operation in conjunction with transmission control protocol/Internet protocol (TCP/IP) communications for the transmission or reception of packets in a network flow. Network environment 100 may also operate in conjunction with a user datagram protocol/IP (UDP/IP), Fibre Channel over Ethernet (FCoE) or any other suitable protocol where appropriate and based on particular needs. Input/output (I/O) may be consolidated in network environment 100 so that the same physical infrastructure can carry different types of traffic, which typically have different traffic characteristics and transmission requirements.

For purposes of illustrating certain example embodiments of network environment 100, it is important to understand certain activities and communications occurring within a network. Contextual information is provided below to offer an overview of some challenges of managing network resources. Such information is offered earnestly and for teaching purposes only and, therefore, should not be construed in any way to limit the broad applications of the present disclosure.

In certain embodiments, network environment 100 can be representative of a data center environment. The exponential growth of Internet use for business, entertainment, shopping, communication, and information has led to the rapid growth of data centers. More and larger data centers have been erected around the globe as advances in switch, server, and storage technology have generally kept pace with the increasing demand. The continued growth of the Internet for an increasing range of uses has created a focus on data communication where bottlenecks are now frequently the performance limiter.

Data centers can accept and transmit high volumes of network traffic and can perform much of the off-site processing done for Internet operations. The front-end of a data center can connect to the Internet core, for example, where Internet traffic travels to assigned locations using IP addresses. Traffic can be routed through a several layers of switches to servers for processing and other devices for storage.

In general terms, the task of a typical data center is fulfilling requests from a wide range of network users (individuals, businesses, enterprises, other data centers). These requests can include everyday common user tasks, such as loading a web page, streaming audio or video, sending an email, running an application, saving data, or conducting searches or queries, for example. The traffic can be directed to a data center that contains the files, applications, data tables, etc. needed to fulfill the request. Responses can then travel back via the same route.

As seen in FIG. 1, a data center can have a hierarchical or layered structure of various types of programmable switches that route the traffic to servers and storage devices that process the requests from incoming traffic then respond with outgoing traffic. The number of layers in a data center depends on the data center architecture. The larger and heavier the traffic volume of a data center, the more layers and complexity it likely will have.

TCP is the most commonly used transport layer protocol in a data center environment. TCP is generally used on the inner layers of the infrastructure like between data centers and within data centers connections. TCP provides a connection-oriented, reliable, byte stream service. As a connection-oriented service, two devices using TCP must establish a TCP connection with each other before they can exchange data. TCP is a full duplex protocol, meaning that each TCP connection supports a pair of byte streams, one flowing in each direction. Even though one device is often called a "sender" and one is called a "receiver," data is commonly flowing in both directions. However, in most scenarios one device (i.e., the sender) is transmitting a majority of the data.

TCP data is a stream of bytes, much like a data file, where these byte steams are organized into packets. Each packet can contain a packet header with addressing information that identifies the source from which the packet came and the destination to which it should be delivered. For example, a source port and a destination port in the packet header can identify the sending and receiving device by IP address. Combined, these addresses form a unique TCP connection identifier. The packet header can also include information about the data transmission, the data itself, and a flow-control mechanism that allows a receiver to limit how much data a sender can transmit. A packet header is highly structured and can be found at the same place at the beginning of the packet. The remaining segments in packet—the TCP options and data—are variable in length. For example, the number of bytes of actual data contained in a packet can vary between packets.

Devices using TCP to communicate can also use the information contained in packet headers to keep track of the data transmission to ensure that all the transmitted data is received. TCP can arrange for retransmission if it determines that a packet was not received. TCP can also coordinate traffic so device buffers will not overflow and cause lost packets or timeouts that exacerbates data communication bottlenecks. Receiving devices can tell transmitters how much data to send in a packet, and fast senders are occasionally halted so slower receivers can catch up.

Latency (i.e., transmission delay) can be used as a critical metric for measuring data communication performance. A common latency metric is a round trip time (RTT). In general terms, RTT is the time it takes a device to send a TCP packet to a receiver and then receive an acknowledgement in response. Physical distance is one important attribute that affects RTT, but traffic congestion and low bandwidth can also impact RTT.

TCP communication within the data center and on the Internet involves a complex mix of different types of data flows with different latency, throughput, and bandwidth requirements. In a typical data center, multiple TCP flows can occur simultaneously. These different types of data streams can generally be divided into foreground traffic and background traffic. Foreground traffic is typically shorter data flows with low latency tolerance. As used herein, the term "foreground traffic" may include any traffic that is directly connected to the user experience, or any other traffic designated as having a higher priority than background traffic. Users expect to have a timely response during on-line activities, including searches for information that requires referencing multitudes of indexes, tables, or files. Delays in traffic (or high latency) to and from the user can lead to an unsatisfactory user experience. This is a critical factor since user experience is often directly tied to revenue in the commercial data center business paradigm.

High burst tolerance can be another requirement for priority traffic. In general terms, high burst tolerance is the ability to handle a high amount of traffic over a short span of time. Switch buffers that are filled with low priority background traffic have their burst tolerance reduced since the device needs the buffer space to store short, rapid bursts of traffic until it can processed.

Background traffic is often contained within the data center or between data centers. Background traffic performs background tasks such as updating databases or applications, backing up data, or doing other administrative functions that are usually not time sensitive and that do not impact or interact with users directly. Background traffic usually has minimal latency requirements and, further, tends to include long streams of data that can take a significant of amount of time to transmit. However, background traffic tends to fill the buffers of inexpensive commodity switches that are common in the modern data center environment, thus adversely affecting foreground traffic latency. Server or rack switches typically sit atop of a rack or set of servers and direct the traffic flow between the server set and the data center traffic and eventually the Internet core. A common attribute of these low-cost switches is limited memory for buffering communication, and the long flow background traffic continually fills the buffers, leaving little space for the higher priority foreground traffic. Lack of buffer space, in turn, leads to dropped packets, retransmissions, delays, and ineffective use of available bandwidth. For example, background flows such as updating data structures can be large-bandwidth and long-living flows. Such flows might consume all buffer space in a switch, which can delay processing of foreground application packets and directly impact user experience.

Partition-aggregator workflows, for example, generally create foreground traffic with strict latency considerations. Many large-scale web applications use a partition-aggregator workflow to retrieve results for a wide variety of web operations, from searches for web content to shopping queries. Queries or other requests from an application can be split into sub-requests and passed down to a number of aggregators that partition the task. The task can be broken down into smaller pieces, and then passed to other aggregators that can break up the task into yet smaller tasks, which are eventually passed down to workers that perform the task and return a result. The aggregators then combine the worker responses and pass them up to the next level aggregator that in turn combines all of the responses, eventually returning the final result to the application or a top-level aggregator.

Partition-aggregator schemes are often implemented with a particular programming design (known as map-deduce) that is capable of using multiple machines to execute the program, where most programs are written to run on a single machine. While this hierarchical programming-execution method can theoretically provide fast results for queries or application processing, involving multiple layers in processing makes communication timing between layers a critical factor.

Aggregators typically place a time limit on receiving a response from lower level aggregators or workers to prevent hang-ups and long delays. For example, if an application requires a result in less than 100 milliseconds, a top-level aggregator may in turn give a deadline of 50 milliseconds to a mid-level aggregator, which in turn may give a deadline of 10 milliseconds to a worker. If a response is not received within the allotted time, then the worker or aggregator is ignored and a final result is compiled that includes responses only from the devices that responded in the allotted time window. Any missing worker or aggregator result will have a negative impact on the quality of the final result. Every unit that did not respond in the allotted time diminishes the quality of the final.

For example, a query arriving at an aggregator or collector is typically split into multiple sub-queries and dispatched to workers. The workers act on these restricted sub-queries and send back results to the aggregator. This process can be sensitive to latency and any delay in the process due to buffering or packet loss (e.g., because of full buffers) results in a user not getting relevant search results, which is directly tied to user experience and, thus, revenue.

In accordance with embodiments described herein, network environment 100 can overcome these shortcomings (and others) by reducing packet delays experienced by foreground traffic, particularly in data centers. For example, in certain embodiments, an application control engine can track flows in a data center and distinguish foreground traffic from background traffic. In some embodiments, the application control engine may further prioritize certain types of foreground traffic, such as map-reduce traffic. A latency metric such as round-trip times can be monitored for each flow, and preemptive action may be taken if the metric indicates latency for foreground traffic is increasing. Preemptive actions may include, for example, delaying acknowledgements (i.e., ACKs) for background or lower-priority traffic, or placing background or lower-priority packets in a delay buffer.

In more particular embodiments, network environment 100 may provide a method for taking preemptive action to keep background traffic from filling switch buffers (acting as a TCP receiver) and affecting latency-sensitive priority traffic. Round-trip times can be continually monitored and when round-trip times for priority flows are rising and/or reach a threshold level, background flows may be put into a time buffer to temporarily delay background flows. In such a scenario, TCP acknowledgements for background traffic may be withheld, limiting transmission, which generally increases round-trip times for background traffic. However, relatively small increases in round-trip times should not negatively impact background flows. Such a method may be implemented in loadbalancing or switch hardware, for example, in which designated memory can be used as a time buffer to temporarily delay background flows (typically for a few milliseconds).

Foreground traffic may be identified, recognized, or otherwise distinguished from background traffic in several ways. In one embodiment, for example, a flag or notification may be implemented in a TCP packet header that indicates the type of traffic. This could potentially be in the option field or reserved field, since it is reserved for such future implementation. In another example embodiment, flows belonging to foreground traffic may be identified through inherent characteristics of foreground flow and background flow. For example, map-reduce application packets usually have about 2 Kbytes of data. Other distribution characteristics could also be used to identify map-reduce application traffic.

Figure 2:
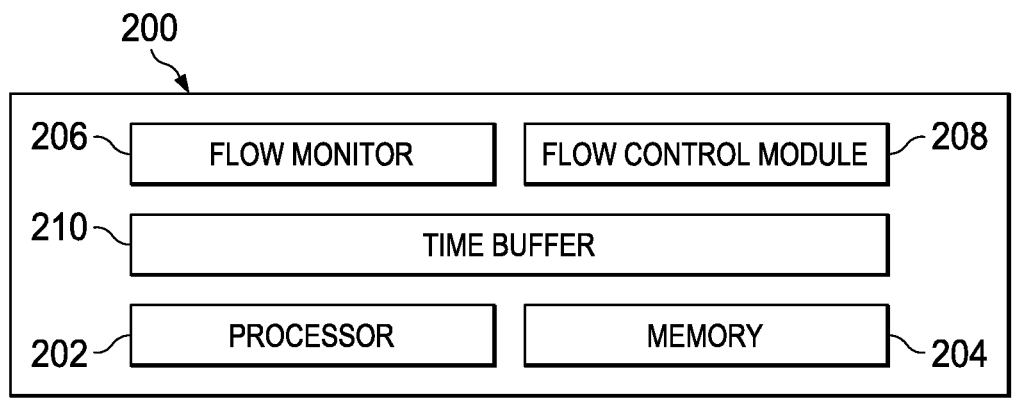
FIG. 2 is a simplified functional block diagram illustrating additional details that may be associated with example embodiments of an application control engine in the network environment.

Turning to FIG. 2, FIG. 2 is a simplified functional block diagram illustrating additional details that may be associated with example embodiments of an application control engine 200 in network environment 100. Application control engine 200 may, for example, be implemented as an ASIC or line card in any or all of switches 102a-102b, switches 104a-104b, or switches 106a-106b. In the example embodiment of FIG. 2, application control engine 200 includes a processor 202, a memory 204, a flow monitor 206, a flow control module 208, and a time buffer 210, and may include additional hardware and/or software elements to facilitate the traffic control operations described herein. Application control engine 202 can also be configured to store, aggregate, process, export, and/or otherwise maintain data in any appropriate format, where these activities can involve processor 202, memory 204, flow monitor 206, flow control module 208, and/or time buffer 210, for example. In many embodiments, an 8-16 megabyte time buffer may be sufficient for the activities discussed herein.

Elements in network environment 100, including switches 102a-102b, switches 104a-104b, switches 106a-106b, server 110, application control engine 200, and others, are representative of any suitable network element or node, which is meant to encompass network appliances, servers, routers, switches, gateways, bridges, loadbalancers, modules, or any other device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with elements of network environment 100, each of switches 102a-102b, switches 104a-104b, switches 106a-106b, server 110, application control engine 200, and others can include memory elements for storing information to be used in the operations outlined herein. Moreover, each element may include one or more network interfaces, which may also include appropriate memory elements. Each of switches 102a-102b, switches 104a-104b, switches 106a-106b, server 110, application control engine 200, and others may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received by switches 102a-102b, switches 104a-104b, switches 106a-106b, server 110, application control engine 200, and others could be provided in any database, register, queue, table, cache, control list, or other storage structure, all of which can be referenced at any suitable timeframe. Any such storage options may be included within the broad term "memory element" or "memory" as used herein.

In certain example implementations, the traffic control functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the traffic control activities described herein.

In one example implementation, switches 102a-102b, switches 104a-104b, switches 106a-106b, server 110, application control engine 200, and others may include software modules (e.g., flow control module 208) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of switches 102a-102b, switches 104a-104b, switches 106a-106b, server 110, application control engine 200, and others may include one or more processors (or virtual processors) that can execute software or an algorithm to perform traffic control activities as discussed herein. A processor or virtual processor can execute any type of instructions associated with the data to achieve the operations detailed herein. In one example, a processor (such as shown in FIG. 2) could transform an element or an article (e.g., data) from one state or thing to another state or thing. In another example, the traffic control activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 3:
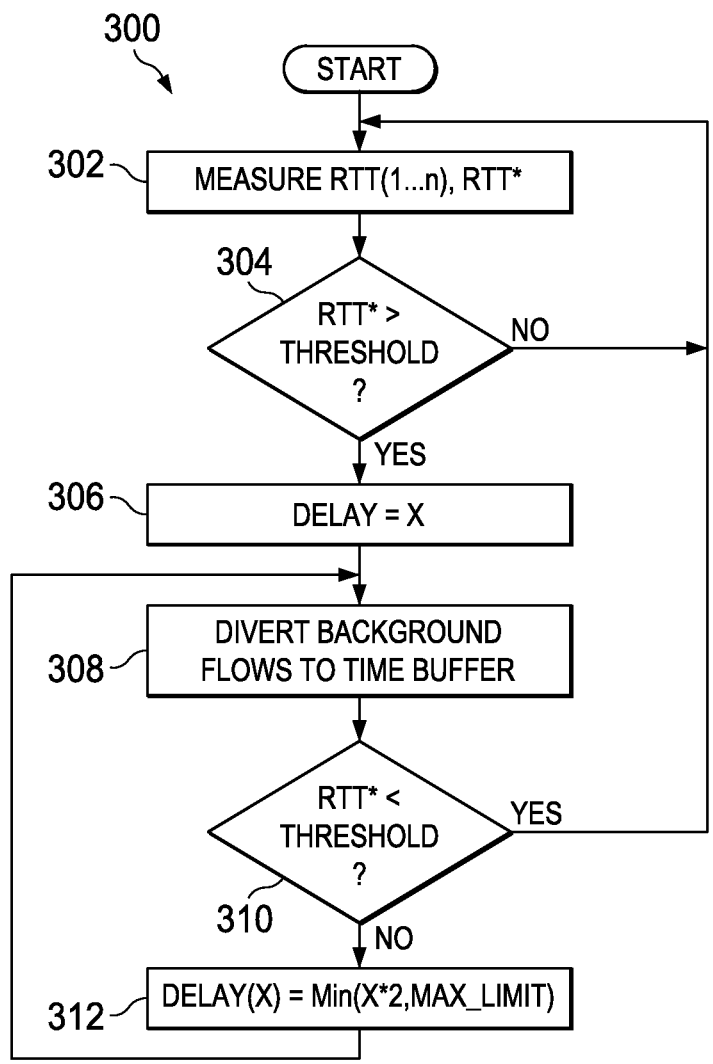
FIG. 3 is a simplified flow diagram illustrating potential operations that may be associated with example embodiments of the network environment.

FIG. 3 is a simplified flow diagram 300 illustrating potential operations that may be associated with example embodiments of network environment 100. In more particular embodiments, such operations may be implemented in any network element, such as application control engine 103a-103b or 200, including processor 202, memory 204, flow monitor 206, flow control module 208, and/or time buffer 210, for example. In other embodiments, such operations may be distributed across network elements.

As a preliminary matter, an administrator or other user may configure such a network element to specify certain operational parameters, such as a measurement interval, an initial delay buffer time, a maximum delay buffer time, and a RTT threshold. Alternatively, a vendor may configure such parameters.

At 302, a round trip time of each background flow RTT (1 . . . n) and a foreground flow (RTT*) may be periodically determined (e.g., measured or estimated) at the configured interval. For purposes of illustration only, this example is limited to a single foreground flow, but the principles describes are readily extensible to larger numbers of foreground flows. Moreover, the foreground flow RTT* in this example may be representative of any flow identified as a foreground flow, or a flow having a higher priority relative to other flows. For example, map-reduce flows may be explicitly designated as foreground or priority flows. These types of flows may be identified with a variety of methods, such as by modifying the header of the flow to include an identifying flag (e.g., a bit field). Known parameters may also be used to deduce which flows are foreground or priority flows. For example, map-reduce flows have certain inherent characteristics such as packet size and distribution of packet arrival times.

If the foreground flow RTT* exceeds the RTT threshold at 304, a latency reduction response may be implemented. The RTT threshold may be a fixed round trip time, or it may be a RTT gradient over a configurable interval. For example, a latency reduction response may be activated if the round-trip time of a map-reduce flow is rising with a positive slope gradient above the threshold. In the example embodiment illustrated in FIG. 3, the latency reduction response includes initiating a delay period at 306 and diverting the background flows to a buffer (e.g., time buffer 210) at 308 until the round-trip time of the foreground flow falls below the threshold at 310. The delay period may be increased iteratively at 312 in some embodiments. For example, the time period for which background flows are delayed at 308 may be based on an exponential back-off algorithm, so that the delay time may be doubled in each iteration up to a maximum limit. In other embodiments, the response may additionally or alternatively include delaying acknowledgements (ACKs) to background flows, thereby increasing the round-trip times of the background flows and reducing the steady state throughput of the background flows. In general, background flow timeout values are on the order of seconds, and thus packets should not timeout if the delay is capped on the order of milliseconds.

Figure 4:
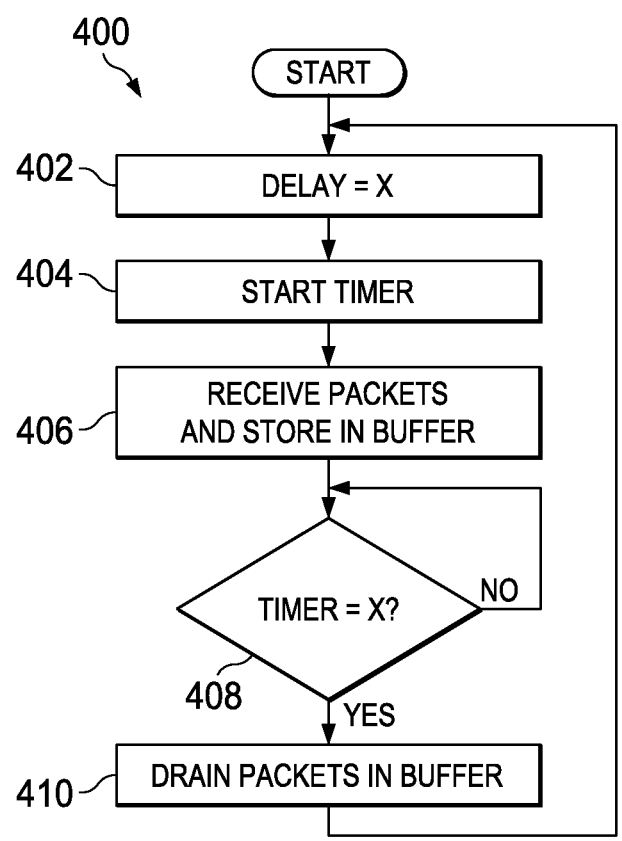
FIG. 4 is a simplified flow diagram illustrating other potential operations that may be associated with example embodiments of the network environment.

FIG. 4 is a simplified flow diagram 400 illustrating other potential operations that may be associated with example embodiments of network environment 100. More particularly, the operations illustrated in FIG. 4 may be associated with managing a buffer, such as time buffer 210 in application control engine 103a-103b and/or 200. Again, such operations may be implemented in any network element.

A timer delay X may be set at 402. This value may, for example, be initialized to an initial delay buffer time established by an administrator, user, or vendor, or may be adjusted dynamically (e.g., by flow monitor 206 or flow control module 208). In one example embodiment, as described above, the delay buffer time may be adjusted based on an exponential back-off algorithm. At 404, a timer may be started. Packets can be received at 406 and stored in a buffer (e.g., time buffer 210) until the timer is equal to the timer delay X at 408. If the timer is equal to the timer delay X at 408, the packets stored in the buffer may be drained at 410.

As described herein, network environment 100 can provide many significant advantages, some of which have already been discussed. More particularly, network environment 100 can improve latency and burst tolerance of foreground or priority traffic that directly impact the user experience, without modifying packets or deep packet inspection. In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that network environment 100 is readily scalable and can accommodate a large number of components, as well as more complicated/sophisticated arrangements and configurations. Accordingly, the examples provided should not limit the scope or inhibit the broad teachings of network environment 100 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by, or within, network environment 100. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   identifying a foreground flow that has a higher priority than at least one background traffic flow in a network;
   determining a latency metric associated with the foreground flow; and
   activating a latency reduction response if the latency metric exceeds a threshold, wherein the latency reduction response comprises diverting one or more background flows in the network to a buffer for a delay period until the latency metric is below the threshold.

2. The method of claim 1, wherein the latency reduction response further comprises delaying acknowledgements for one or more background flows if the latency metric exceeds the threshold.

3. The method of claim 1, wherein the delay period is periodically modified until the latency metric is below the threshold.

4. The method of claim 1, wherein the delay period is periodically modified based on an exponential back-off algorithm until the latency metric is below the threshold.

5. The method of claim 1, wherein identifying the foreground flow comprises identifying inherent characteristics of the foreground flow.

6. The method of claim 1, wherein identifying the foreground flow comprises identifying a flag in a header of the foreground flow.

7. The method of claim 1, wherein the latency metric is a round-trip time.

8. The method of claim 1, wherein the foreground flow is a map-reduce flow.

9. Logic encoded in one or more tangible non-transitory media that includes code for execution and when executed by a processor operable to perform operations comprising:
   identifying a foreground flow that has a higher priority than at least one background traffic flow in a network;
   determining a latency metric associated with the foreground flow; and
   activating a latency reduction response if the latency metric exceeds a threshold, wherein the latency reduction response comprises diverting one or more background flows in the network to a buffer for a delay period until the latency metric is below the threshold.

10. The logic of claim 9, wherein the latency reduction response further comprises delaying acknowledgements for the one or more background flows if the latency metric exceeds the threshold.

11. The logic of claim 9, wherein the delay period is periodically modified until the latency metric is below the threshold.

12. The logic of claim 9, wherein the delay period is periodically modified based on an exponential back-off algorithm until the latency metric is below the threshold.

13. The logic of claim 9, wherein identifying the foreground flow comprises identifying inherent characteristics of the foreground flow.

14. The logic of claim 9, wherein identifying the foreground flow comprises identifying a flag in a header of the foreground flow.

15. The logic of claim 9, wherein the latency metric is a round-trip time.

16. The logic of claim 9, wherein the foreground flow is a map-reduce flow.

17. An apparatus, comprising:
   a memory element configured to store data,
   a processor operable to execute instructions associated with the data, and
   a flow control module, the apparatus being configured to:
      identify a foreground flow that has a higher priority than at least one background traffic flow in a network;
      determine a latency metric associated with the foreground flow; and
      activate a latency reduction response if the latency metric exceeds a threshold, wherein the latency reduction response comprises diverting one or more background flows in the network to a buffer for a delay period until the latency metric is below the threshold.

* * * * *